United States Patent [19]

Wong

[11] Patent Number: 5,308,578
[45] Date of Patent: May 3, 1994

[54] FATIGUE RESISTANT LEAD-TIN EUTECTIC SOLDER

[75] Inventor: Boon Wong, Canoga Park, Calif.

[73] Assignee: Hughes Aircraft Company, Los Angeles, Calif.

[21] Appl. No.: 15,875

[22] Filed: Feb. 10, 1993

Related U.S. Application Data

[63] Continuation-in-part of Ser. No. 783,300, Oct. 28, 1991, abandoned.

[51] Int. Cl.⁵ ............................................. C22C 13/00
[52] U.S. Cl. .................................. 420/558; 420/559; 228/262.9
[58] Field of Search ................ 420/558, 559; 148/400, 148/405; 228/263.11

[56] References Cited

U.S. PATENT DOCUMENTS

| | | | |
|---|---|---|---|
| Re. 29,563 | 3/1978 | Manko | 228/263.11 |
| 1,087,561 | 2/1914 | Tebbetts, 2D | 420/559 |
| 1,568,224 | 1/1926 | Karafiat | 420/559 |
| 1,669,580 | 5/1928 | Speichert | 420/559 |
| 3,607,252 | 9/1971 | North | 420/559 |
| 4,869,871 | 9/1989 | Kawai et al. | 420/559 |
| 4,937,045 | 6/1990 | Silverman | 420/559 |

FOREIGN PATENT DOCUMENTS

| | | | |
|---|---|---|---|
| 249062 | 9/1988 | Czechoslovakia | 420/559 |
| 0307638 | 3/1989 | European Pat. Off. | |
| 3425290 | 1/1986 | Fed. Rep. of Germany | |
| 2172423 | 11/1973 | France | |
| 45-002093 | 1/1970 | Japan | |
| 60-203394 | 10/1985 | Japan | |
| 1-237095 | 9/1989 | Japan | |
| 3-106591 | 5/1991 | Japan | |
| 2198676 | 6/1988 | United Kingdom | |
| 2216834 | 10/1989 | United Kingdom | |

OTHER PUBLICATIONS

Chem Abs (I) CA95(24):208027h 1981.
Chem Abs 91(26):215343d 1979; Abstract.
Svar. Proizvod, (9), 18–19 1979.
Ackroyd, M. L. et al., Metals Technology, Feb. 1975, pp. 73–85.
Tribula et al., Journal of Electronic Packaging, Jun. 1990, vol. 112, pp. 87–93.
Federal Specification, QQ-S-571E.; Oct. 20, 1986 "Solder; Tin Alloy, Tin–Lead Alloy, and Lead Alloy".
Patent Abstracts of Japan #005128 (of JP 56–062941); Aug. 1981.
Patent Abstracts of Japan #015164 (of JP 03–032487); Jun. 1989.
E. R. Bangs and R. E. Beal, "Effect of Low Frequency Thermal Cycling on the Crack Susceptibility of Soldered Joints", Welding Journal, vol. 54, No. 01, Oct. 1975, Miami US, pp. 377S–383S.
N. G. Kartyshov, B. S. Lisitskii and V. I. Shakhvatov, "The Effect of Additions on the Corrosion Resistance of Lead–Tin Solders and of Joints Made with These Solders", 2390 Welding Production, vol. 26, No. 9, Sep. 1979, Cambridge GB, pp. 26–28.

*Primary Examiner*—W. Dean
*Assistant Examiner*—Margery S. Phipps
*Attorney, Agent, or Firm*—M. E. Lachman; M. W. Sales; W. K. Denson-Low

[57] ABSTRACT

The fatigue resistance of lead-tin eutectic solder is increased by doping the solder with about 0.1 to 0.8 weight % of a dopant selected from cadmium, indium antimony and mixtures thereof. The doped eutectic solder exhibits increased resistance to thermally or mechanically induced cyclic stress and strain. As a result, the fatigue resistance of the solder joint is increased. Combination of dopants, such as indium and cadmium, in combined amounts of less than 0.5 weight % are especially effective in increasing the fatigue resistance of the lead-tin eutectic solder.

20 Claims, No Drawings

FATIGUE RESISTANT LEAD-TIN EUTECTIC SOLDER

This is a continuation-in-part of application Ser. No. 07/783,300 filed Oct. 28, 1991 now abandoned.

BACKGROUND OF THE INVENTION

1. Field of the Invention

The present invention relates generally to lead-tin eutectic solder. More particularly, the present invention relates to improving the fatigue resistance of lead-tin eutectic solder.

2. Description of Related Art

Eutectic and near-eutectic lead-tin solder alloys are used to provide solder joints in a wide variety of electronic devices. In addition to providing electrical connections, the solder joint provides a vital mechanical link between electronic devices and connectors.

During operation, many electrical devices are subjected to vibration and continual changes in temperature. Many times, the coefficient of thermal expansion of the various materials at and around the solder joint are different. As a result, the continual changes in temperature cause the solder joint to be continually subjected to varying degrees of stress and strain. The solder joint may also undergo continual stress due to vibrations and other forces exerted against the joint.

It would be desirable to provide solder joints which are structurally strong and resist fatigue due to mechanical or thermal stress and strain. Such fatigue resistant solder would be especially well-suited for use in electronic equipment which is subjected to extreme thermal fluctuations and mechanical duress. Further, fatigue resistant solder would be desirable for use in electronic devices where a long service life is required.

SUMMARY OF THE INVENTION

In accordance with the present invention, an improved lead-tin eutectic solder is provided which is more resistant to fatigue and breakage than conventional lead-tin eutectic solder. The present invention is based upon the discovery that the addition of about 1.0 to 0.8 weight % of a dopant, such as cadmium, indium or antimony, increases the fatigue resistance of lead-tin eutectic solder.

As a feature of the present invention, it was discovered that optimum increases in fatigue resistance for the lead-tin eutectic solder was achieved by adding between about 0.1 and 0.8 weight % of the dopant. In addition, it was discovered that further increases in fatigue resistance can be achieved by adding a mixture of dopants, such as indium and cadmium. Large increases in fatigue resistance are obtained when the lead-tin eutectic is doped with about 0.2 weight % cadmium and about 0.2 weight % indium.

As other features of the present invention, the solder is provided in the form of a powder and in the form of a paste.

As a further feature of the present invention, a method is disclosed wherein the doped lead-tin eutectic solder is used to bond two metal surfaces together. This method is especially well-suited for soldering the whole spectrum of electronic connectors together.

The present invention also provides a method of improving the fatigue resistance of a lead-tin solder joint by forming the solder joint from a lead-tin eutectic solder comprising the above-discussed dopant.

The improved lead-tin eutectic solder in accordance with the present invention is an improvement over existing lead-tin eutectic solder since it provides the same degree of electrical conductivity and connection as the conventional eutectic solder while at the same time providing increased resistance to fatigue and joint fracture in the solder joint.

The above-discussed and many other features and attendant advantages of the present invention will become better understood by reference to the following description of the preferred embodiments.

DESCRIPTION OF THE PREFERRED EMBODIMENTS

The present invention is based upon the discovery that lead-tin eutectic solder can be doped with small amounts of specific dopants in order to increase the resistance of the solder to fatigue and fracture caused by continual stress and strain at the solder joint. The lead-tin eutectic solder in accordance with the present invention includes conventional eutectic solder which is free of silver and gold and which is doped with about 1.0 to 0.8 weight % of the dopants cadmium, indium, or antimony or mixtures thereof.

The conventional lead-tin eutectic solder which is doped is the well-known and widely used eutectic solder material which contains 63 weight % tin and 37 weight % lead. The present invention is also applicable to near-eutectic lead-tin solders wherein the weight percent of tin and lead are about 3 weight % higher or lower than the 63/37 weight % eutectic mixture. As used herein the term "eutectic" is intended to include "near eutectic" compositions, unless otherwise specified.

Military-qualified lead-tin eutectic solders which are used in the electronics industry, such as for soldering printed wiring boards, typically contain impurities such as antimony, bismuth, copper, iron, zinc, aluminum, arsenic, and other miscellaneous elements, each at levels well below 0.08 weight percent, except for antimony which may be present at up to 0.50 weight percent and bismuth which may be present at 0.25 weight percent. The specific values for these impurities are set forth in the "Federal Specification, Solder: Tin Alloy, Tin-Lead Alloy, and Lead Alloy," Fed. Spec. QQ-S-571E for composition Sn 63 in Table V therein. Solders used for commercial purposes may contain other impurities also. However, in accordance with the present invention silver and gold are not included in the solder composition.

The preferred amount of dopant added to the lead-tin eutectic solder is between about 0.1 and 0.8 weight % of dopant. The preferred dopants are cadmium and indium. The dopants may be added individually to the solder or they may be added in combination. Further, it was discovered that doping the lead-tin eutectic solder with both indium and cadmium at a total doping level of less than about 0.5 weight % provides even further increases in fatigue resistance. When using a combination of dopants, the dopants may be added in equal or unequal amounts.

The dopants in accordance with the present invention are incorporated into the solder by any of the well known processes for doping lead-tin solders. Preferably, the dopants in granular form are added to the solder components in granular form and the solder pre-mix is heated to a sufficient temperature (e.g. 230° to 250° C.) to form a liquid. The solder and dopants are maintained as a liquid for a sufficient time to insure uniform distribution of the dopants throughout the solder and the formation of a uniform alloy. Optionally the granular dopant and the eutectic lead-tin solder may be melted to alloy the dopant. The doped solder may then be immediately used or solidified and stored for future use. Other procedures for doping the solder are possible provided that the dopants are uniformly distributed throughout the solder mixture.

For use in soldering, the doped lead-tin alloy of the present invention may be provided in various forms such as an ingot, a billet, wire, a preform, a powder or a paste. The molten doped lead-tin alloy described above may be solidified to form an ingot. The ingot may later be melted in a non-oxidizing atmosphere, such as nitrogen, formed into a billet, which is then drawn to a wire, which may subsequently be stamped or formed into a preform having a desired geometric shape, such as a disk, washer, bar, or sphere, using known methods. The preform may then be placed between the two surfaces to be soldered and heat is applied to effect soldering, as is known in the art.

To form the powder, an ingot of the doped lead-tin alloy formed as described above is melted in a non-oxidizing atmosphere and then formed through gas jets having orifices of a given diameter, to form droplets of liquid alloy which subsequently solidify into spherical particles. Alternatively, the melted alloy may be subjected to a rotating blade to form liquid droplets which subsequently solidify into powder particles. The particle size of the powder is optimized for the intended use of the powder. Typical particle sizes are within the range of about 10 to 75 micrometers, and multiple particle sizes may be used in single powder formulation. The powder is stored in an oxygen-free environment to prevent oxidation and is subsequently used to form a paste as described below. Each particle in the powder is composed of the above-described doped lead-tin alloy.

To form the paste, the powder formed as described above is mixed with a flux, in order to make the solder dispensible. The flux comprises an activator (i.e. an oxide-removal or tarnish-removal agent), a vehicle (i.e. a solvent), and a rheology modifier or thinner, to adjust the viscosity. A typical paste formulation may comprise about 80-90 weight percent powder and about 20-10 weight percent flux. The powder and flux are mechanically mixed to form a homogenous mixture. The viscosity of the paste is optimized for the intended use of the paste, such as by modifying powder size and powder distribution. The paste is then used for soldering employing known methods.

As is known in the art, one or both of the metal surfaces to be soldered may optionally be plated with the solder material, such as by known electrolytic processes, prior to the solder operations in order to improve the adhesion of the solder to the metal surface. For example, the copper pads on a printed wiring board may be plated with the solder material and then the solder of the present invention is applied to the plated surface to form a solder joint using known techniques. The metal surface is preferably plated with the doped lead-tin eutectic surface of the present invention, but may alternatively be plated with an undoped, commercially available solder. Example 12 presents data showing the improved results obtained by using the doped solder of the present invention on a plated metal surface.

The doped lead-tin solder in accordance with the present invention is used in the same manner as conventional lead-tin solder. The doped solder is well-suited for connecting wires, pins and other electrical interconnectors together. The preferred use for the doped solder is in providing joints which are subjected to continual thermal or mechanical stress and strain. However, the doped solder in accordance with the present invention may be used to replace lead-tin solder wherever a strong, solid and fatigue resistant solder joint is required.

Examples of practice are as follows.

EXAMPLE 1

This example describes the formation and testing of a high purity (99.999%) lead-tin eutectic solder containing 62.0 weight % tin and 37.0 weight % lead doped with 1% cadmium. Doping was carried out by dry mixing a sufficient amount of high purity (99.999%) cadmium solid with appropriate amounts of high purity (99.999%) lead and tin granules to provide a 1.0 weight % cadmium level in the solder mix. The cadmium was then intimately alloyed in the molten eutectic solder at about 250° C. for a period of at least 30 minutes in a controlled argon atmosphere to insure uniform distribution of the dopant. The cadmium doped eutectic solder displayed solder characteristics which are equivalent to the undoped eutectic solder. A dog-bone shaped tensile specimen was fabricated and mechanically tested using a testing machine obtained from Instron of Canton, Mass., at room temperature. The cadmium doped specimen was loaded into the machine. A cyclic sawtooth stress waveform at 0.001 Hertz (Hz) was applied with a peak tensile stress at about 110% of the generic yield of the lead-tin solder at room temperature. The cadmium doped dog-bone specimen underwent 35 cycles prior to failure. An identical dog-bone shaped specimen was prepared from undoped high purity (99.999%) lead-tin eutectic solder. The undoped eutectic solder lasted only two cycles prior to failure when subjected to the same tensile fatigue conditions.

EXAMPLE 1

High purity (99.999%) lead-tin eutectic solder was doped with 0.8 weight cadmium in the same manner as described in Example 1, except that the cadmium was alloyed in the molten eutectic whose surface was always fully covered by a layer of rosin mildly activated (RMA) solder flux to prevent oxidation. Alloying was performed at a temperature of about 250° C. over a period of about 8 hours in a flowing nitrogen atmosphere. The addition of the 0.8 weight % cadmium dopant did not alter the soldering characteristics of the eutectic solder. Torsion test specimens made of cylindrical copper rods joined by the solder were prepared. These specimens were subjected to torsional (shear) fatigue testing of the solder joint with the Instron testing machine at room temperature. The cycling frequency was 0.01 Hz and the plastic strain range per cycle applied on the solder was approximately 10%. The average cycles-to-failure for the 0.8% cadmium doped eutectic solder was 34. The average cycles-to-failure for an identical torsion test specimen of undoped high-purity lead-tin eutectic solder was 19.

EXAMPLE 3

High-purity lead-tin eutectic solder was doped with 0.4 weight % cadmium in the same manner as Example 2. Torsion test specimens were also prepared and subjected to testing in the same manner as Example 2. The specimens failed after an average of 32 cycles.

EXAMPLE 4

High-purity lead-tin eutectic solder was doped with 0.2 weight % cadmium following the procedure set forth in Example 2. Torsion test specimens were also prepared and subjected to testing under the same conditions as Example 2. The average cycles-to-failure for the specimens was 34.

EXAMPLE 5

A doped high-purity lead-tin eutectic solder dog-bone specimen was prepared in the same manner as Example 1 except that 1% indium was substituted for cadmium. The tensile testing conditions to establish cycles-to-failure were the same as in Example 1. The indium doped sample lasted five cycles before failing.

EXAMPLE 6

A doped high-purity lead-tin eutectic solder dog-bone specimen was prepared and tested in the same manner as Examples 1 and 5, except that antimony was used as the % dopant. The cycles-to-failure for the antimony doped lead-tin eutectic solder was 4.

EXAMPLE 7

High-purity lead-tin eutectic solder was doped with 0.1 weight % cadmium and 0.1 weight % indium in the same manner as Examples 2, 3 and 4. The same torsional fatigue testing procedure as set forth in Example 2 was used. The average cycles-to-failure for this combined cadmium-indium doped eutectic solder was 53.

EXAMPLE 8

High-purity lead-tin eutectic solder was doped with 0.2 weight % cadmium and 0.2 weight % indium in the same manner as in Examples 2, 3, 4, and 7. The same torsional fatigue testing procedure as set forth in Example 2 was used. The average cycles-to-failure for the combined cadmium-indium doped eutectic solder was 120.

EXAMPLE 9

Commercial-purity lead-tin eutectic solder which was free of silver and gold (Kester Sn63, QQ-S-571 obtained from Kester Solder of Des Plaines, Ill.) was doped with 0.1 weight % cadmium and 0.1 weight % indium. Alloying was conducted in the same manner as in Examples 2, 3, 4, 7 and 8. The same torsional fatigue testing procedure as set forth in Example 2 was used. The average cycles-to-failure for the combined cadmium-indium doped eutectic solder was 71. The average cycles-to-failure for an identical torsion test specimen of undoped commercial-purity eutectic solder (Kester Sn63, QQ-S-571) was 18.

EXAMPLE 10

The same commercial-purity lead-tin eutectic solder as used in Example 9 was doped with 0.2 weight % cadmium and 0.2 weight % indium. Alloying was conducted in the same manner as in Examples 2, 3, 4, 7, 8, and 9. The same torsional fatigue testing procedure as set forth in Example 2 was used. The average cycles-to-failure for this combined cadmium-indium doped commercial-purity eutectic solder was 68.

EXAMPLE 11

The same commercial-purity lead-tin eutectic solder as used in Example 9 was doped with 0.4 weight % cadmium and 0.4 weight % indium. Alloying was conducted in the same manner as in Examples 2, 3, 4, 7, 8, 9, and 10. The same torsional fatigue testing procedure as set forth in Example 2 was used. The average cycles-to-failure for this combined cadmium-indium doped commercial-purity eutectic solder was 101.

EXAMPLE 12

This example presents comparative data on the thermal fatigue resistance of the solder of the present invention and of a conventional solder when used to solder metal surfaces which have been previously plated with lead-tin solder.

A solder paste was prepared in accordance with the present invention containing 0.4 weight percent cadmium and 0.4 weight percent indium. A control paste was prepared having essentially the same composition, except that the solder contained no cadmium or indium.

Surface-mount assemblies were fabricated with both solder pastes in the same manner and consisted of 68-pin ceramic packages (0.95 inch by 0.95 inch or 2.4 cm by 2.4 cm) surface mounted to polyimide-glass printed wiring boards. The copper pads on the printed wiring boards were initially solder plated with Sn-Pb eutectic alloy to a thickness of about 0.3 mils or 0.0008 cm before fusing. The solder joints in the assemblies were subsequently produced by vapor phase reflow processing using a peak temperature of about 216° C.

Assemblies consisting of joints fabricated from the solder paste of the present invention and joints fabricated from the control solder were tested under the same thermal cycling conditions: −55° C. to 125° C. and back to −55° C., 5° C./minute transition rate, 30 minutes dwell as 125° C. and 15 minutes dwell at −55° C. Comparison between the thermal fatigue failure data (i.e. visible solder cracks) obtained from both types of solder joints revealed a significantly higher fatigue resistance of the solder thermal cycles, 544 joints of each solder type were examined. The failure population of the solder joints formed from the solder paste of the present invention was only 0.14 times that of the transitional eutectic solder joints of the control. This a seven-fold improvement in the thermal fatigue resistance which is achieved by the present invention.

As is apparent from the above examples, doping of lead-tin eutectic solders in accordance with the present invention substantially increases the resistance of the solder to fatigue failure. Further, the combination of cadmium and indium to provide a total dopant level of less than 0.5 weight % provides an even further increase in fatigue resistance which is not obtained when a single dopant is used.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A lead-tin eutectic solder for use in soldering metal surfaces together consisting of:

(a) a lead-tin eutectic solder which is free of silver gold and phosphorus; and (b) about 0.1 to 0.8 weight percent of a dopant consisting of a member selected from the group consisting of a mixture of cadmium and indium, and a mixture of cadmium, indium, and antimony, wherein said solder with said dopant has improved fatigue resistance.

2. An improved lead-tin eutectic solder according to claim 1 wherein said lead-tin eutectic solder contains about 0.2 weight percent cadmium and about 0.2 weight percent indium.

3. The lead-tin eutectic solder according to claim 1 wherein said lead-tin solder which is free of silver, gold and phosphorus comprises about 60 to 66 weight percent tin and about 34 to 40 weight percent lead.

4. The lead-tin eutectic solder according to claim 1 wherein said solder is provided in a form selected from the group consisting of an ingot, a billet, a wire, and a preform.

5. The lead-tin eutectic solder according to claim 1 wherein said lead-tin eutectic solder contains about 0.4 weight percent cadmium and about 0.4 weight percent indium.

6. In a method for soldering two metal surfaces together using lead-tin eutectic solder, wherein the improvement consists of:

(a) providing a first lead-tin eutectic solder which is free of silver, gold and phosphorous; and (b) doping said first lead-tin eutectic solder which is free of silver, gold, and phosphorous with about 0.1 to 0.8 weight percent of a dopant consisting of a member selected from the group consisting of a mixture of cadmium and indium, and a mixture of cadmium, indium, and antimony, wherein said solder with said dopant provides improved fatigue resistance.

7. An improved method for soldering two metal surfaces together according to claim 6 wherein said first lead-tin eutectic solder contains about 0.2 weight percent cadmium and about 0.2 weight percent indium.

8. The method for soldering two metal surfaces together according to claim 6 wherein said first lead-tin solder which is free of silver, gold, and phosphorus comprises about 60 to 66 weight percent tin and about 34 to 40 weight percent lead.

9. The method for soldering two metal surfaces together according to claim 6 wherein said first lead-tin eutectic solder contains about 0.4 weight percent cadmium and about 0.4 weight percent indium.

10. The method fo claim 6 further comprising: prior to step (a), plating one or both of said metal surfaces with a second lead-tin eutectic solder.

11. The method of claim 10 wherein said second lead-tin eutectic solder is free of silvers gold, and phosphorus and contains about 0.1 to 0.8 weight percent of said dopant.

12. A method for improving the fatigue resistance of a lead-in solder joint comprising forming said solder joint from a composition consisting of:

(a) lead-tin eutectic solder which is free of silver, gold and phosphorus; and (b) about 0.1 to 0.8 weight percent of a dopant consisting of a member selected from the group consisting of a mixture of cadmium and indium, and a mixture of cadmium, indium, and antimony.

13. The method for improving the fatigue resistance of a lead-tin solder joint according to claim 12 wherein said lead-tin solder which is free silver, gold, and phosphorus comprises about 60 to 66 weight percent tin and about 34 to 40 weight percent lead.

14. A solder powder consisting of particles formed from a mixture consisting of:

(a) a lead-tin eutectic solder which is free of silver, gold and phosphorus; and (b) about 0.1 to 0.8 weight percent of a dopant consisting of a member selected from the group consisting of mixture of cadmium and indium, and a mixture of cadmium, indium, and antimony, wherein said dopant improves the fatigue resistance of said solder.

15. The solder powder according to claim 14 wherein said particles have a diameter within the range of about 10 to 75 micrometers.

16. The solder powder according to claim 14 wherein said lead-tin eutectic solder which is free of silver, gold, and phosphorus comprises about 60 to 66 weight percent tin and about 34 to 40 weight percent lead.

17. A solder paste for use in soldering metal surfaces together, consisting of:

(a) powder formed from a mixture consisting of:

(1) a lead-in eutectic solder which is free of silver, gold and phosphorus; and (2) about 0.1 to 0.8 weight percent of a dopant consisting of a member selected from the group consisting of a mixture of cadmium and indium, and a mixture of cadmium, indium, and antimony; and (b) solder flux.

18. The solder paste according to claim 17 wherein said solder flux consists of:

(a) a flux activator;

(b) a rheology modifier; and (c) a solvent.

19. The solder paste according to claim 17 wherein said paste comprises about 80 to 90 weight percent powder and about 20 to 10 weight percent flux.

20. The solder paste according to claim 17 wherein said lead-tin eutectic solder which is free of silver, gold, and phosphorus comprises about 60 to 66 weight percent tin and about 34 to 40 weight percent lead.

* * * * *

UNITED STATES PATENT AND TRADEMARK OFFICE
CERTIFICATE OF CORRECTION

PATENT NO. : 5,308,578
DATED : May 3, 1994
INVENTOR(S) : BOON WONG

It is certified that error appears in the above-identified patent and that said Letters Patent is hereby corrected as shown below:

Col. 1, line 43, delete "1.0" and insert therefor --0.1--.

Col. 2, line 22, delete "1.0" and insert therefor --0.1--.

Col. 4, line 43, delete "1" and insert therefor --2--.

Col. 6, line 43, after "solder", insert --joints formed from the solder paste of the present invention. After 85--.

Col. 6, lines 46-47, delete "transitional" and insert therefor --traditional--.

Col. 8, line 37, delete "in" and insert therefor --tin--.

Signed and Sealed this

Eighteenth Day of October, 1994

Attest:

BRUCE LEHMAN

*Attesting Officer*  *Commissioner of Patents and Trademarks*